(12) United States Patent
Vook et al.

(10) Patent No.: US 7,818,735 B1
(45) Date of Patent: *Oct. 19, 2010

(54) SYSTEM AND METHOD FOR ENABLING ACCESS AND USE OF SOFTWARE INSTALLED ON A DATA STORAGE SYSTEM

(75) Inventors: Eric R. Vook, Durham, NC (US); J. Brandon Myers, Durham, NC (US); Victor Kan, Morrisville, NC (US); Karl M. Owen, Chapel Hill, NC (US); Dennis Duprey, Raleigh, NC (US); Kenneth John Hayman, Apex, NC (US); Abhijit Aswath, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 1413 days.

This patent is subject to a terminal disclaimer.

(21) Appl. No.: 11/148,477

(22) Filed: Jun. 9, 2005

(51) Int. Cl.
*G06F 9/44* (2006.01)
*G06F 9/445* (2006.01)
*G06F 21/00* (2006.01)

(52) U.S. Cl. .................. 717/168; 717/169; 717/170; 717/171; 717/172; 717/174; 717/175; 717/176; 717/177; 713/182; 713/185

(58) Field of Classification Search ............. 717/169, 717/175
See application file for complete search history.

(56) References Cited

U.S. PATENT DOCUMENTS

| | | | | |
|---|---|---|---|---|
| 6,862,615 | B1* | 3/2005 | Ehrlich et al. | 709/221 |
| 7,249,265 | B2* | 7/2007 | von Carolsfeld et al. | 713/193 |
| 7,536,687 | B1* | 5/2009 | Myers | 717/174 |
| 2002/0038451 | A1* | 3/2002 | Tanner et al. | 717/105 |
| 2003/0149970 | A1* | 8/2003 | Shanbhogue et al. | 717/170 |
| 2005/0044367 | A1* | 2/2005 | Gasparini et al. | 713/172 |
| 2005/0188203 | A1* | 8/2005 | Bhaskaran et al. | 713/176 |
| 2005/0246549 | A1* | 11/2005 | Torrubia-Saez | 713/182 |
| 2006/0026586 | A1* | 2/2006 | Remmel et al. | 717/170 |
| 2006/0123414 | A1* | 6/2006 | Fors et al. | 717/177 |
| 2006/0248504 | A1* | 11/2006 | Hughes | 717/101 |
| 2007/0150964 | A1* | 6/2007 | Orthlieb et al. | 726/27 |

* cited by examiner

*Primary Examiner*—Insun Kang
(74) *Attorney, Agent, or Firm*—Krishnendu Gupta; Robert Kevin Perkins

(57) ABSTRACT

A method, system, or computer program product for controlling access to software component features is disclosed. There are three available states for selectable component features. The three available states, of which one is selected, are: (i) enabled access to the selected software component features for users and other software component features on a data storage system, (ii) enabled access to the selected software component features by other software component features on a data storage system, or (iii) disabled access to the software component features.

11 Claims, 14 Drawing Sheets

SYSTEM AND METHOD FOR ENABLING ACCESS AND USE OF SOFTWARE INSTALLED ON A DATA STORAGE SYSTEM

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

RELATED APPLICATION

This application is related to "Architecture and Apparatus for Enabling Access and Use of Software installed on a Data Storage System" by Vook et al., application Ser. No. 11/148,459 and is filed on even date, Jun. 9, 2005, with this application and which is assigned to EMC Corporation the same assignee as for this application.

FIELD OF THE INVENTION

The invention relates generally to control and access to software, and more specifically to a system and method for enabling access and control of features of software installed on a data storage system.

BACKGROUND OF THE INVENTION

As is known in the art, computer systems generally include a platform generally comprised of a certain hardware base, including a central processing unit and computer memory, an operating system, and application or utility software that runs on top of the operating system. Data storage systems typically include some elements of a computer system and data storage devices installed in an array fashion. Such data storage systems are useful if accessible by users and applications using other computer systems, but typically some software may be accessible to some users and not others depending on what level of software has been installed on their computer and/or the data storage system.

Software, and in particular that for Data Storage Systems, is often comprised of components that have multiple uses. Product features for use by the customer require one or more of these components. It would be advancement in the art to be able to sell software product features individually and without regard to what other components are also purchased. A customer probably would not want to buy extra components just to get a few select features. On the other hand, a software supplier may not want to imply free use of a feature just because some of the components required for that feature happen to be required for another product having similar components. Unfortunately, there is a shortcoming of prior art software design in that these problems are not well addressed or solved. Moreover, it is useful to minimize qualification, distribution, and maintenance costs for software by avoiding methods that release software components in many different combinations.

SUMMARY OF THE INVENTION

To overcome the problems and provide the advantages that have been described above, the present invention in one embodiment is a system and method for controlling access to software features for a data storage system. The method includes the step of selecting exactly one of the following three available states for selected software component features: (i) enabled access to the selected software component features for users and other software component features on a data storage system, (ii) enabled access to the selected software component features by other software component features on a data storage system, or (iii) disabled access to the software component features.

In another embodiment, a computer program product is provided that includes program logic encoded on a data storage medium that is configured for executing the above-referenced steps.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
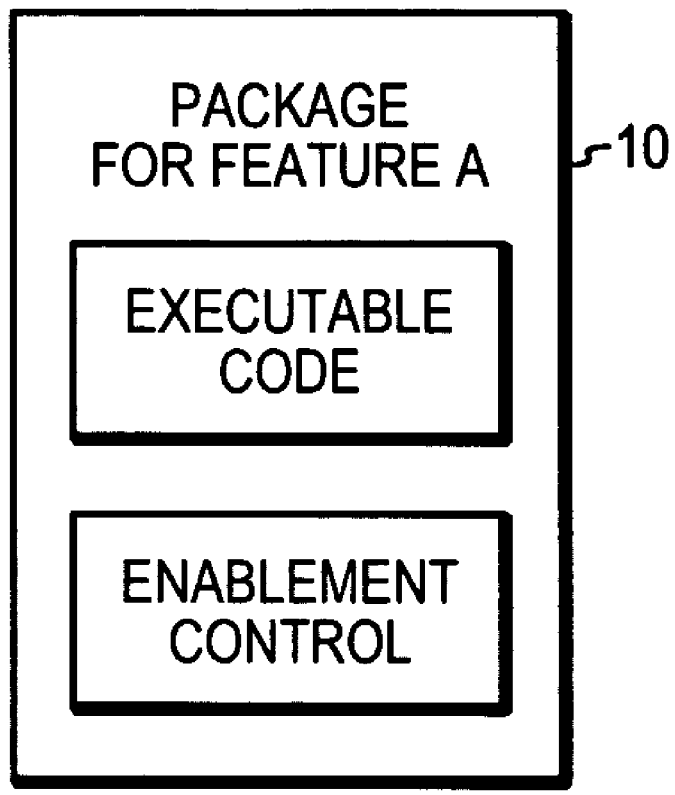
FIG. 1 is a schematic diagram of a prior art method for controlling access and use of software.

The methods and apparatus of the present invention are intended for use in computer systems and may be implemented in data storage systems, such as the CLARIION™ Disk Array system available from EMC Corporation of Hopkinton, Mass. and in particular are useful for controlling access and use of software as the software is upgraded, changed, or otherwise revised over time.

Overview

An objective of the present invention is to allow control and access for upgrades, changes, or other revisions to software without extensive complications to make such easier for the user/customer while also easier and more profitable for the provider of such software.

The invention allows extensive and supportable re-use of software components while controlling user access to product features that use one or more of those components. It supports later activation of new product features by purchase, such features being selectively available. It provides enablers that enable certain features but which are not hardware-platform dependent. It does this in a way that allows for platform variation in software engines, but does not require separate engine packages. Generally features are software functions that are typically presentable to a user.

In a preferred embodiment, the invention includes enablers that control software components from the engines that implement the components. These enablers distinguish between "user enabling" and "array enabling" so that software components (engines) may be available directly to the user or indirectly to other array software. It allows product features which the user purchases to involve user enabling or making available some components to the user. This may be done while only array enabling others, i.e., making available for use by a certain data storage system thereby restricting access that should not be granted to users. Flexibility is provided so that rules may be applied, for example, component enabling may be governed such that the least restrictive mechanism prevails. For example if a component (engine) is user enabled and array enabled, the user will have access to it because user enablement is less restrictive than array enablement. In other words user enabled includes all the access of array enabled, but array enabled is limited as described above. Array enabled is particular to features of components installed on certain data storage systems. An array enabled feature means that a feature on a data storage system can access the particular feature that has been array enabled. Regarding terminology array is a short-hand way of referring to a data storage system.

The inventors have critically recognized a problem with prior art architectures and methodology of activating features. In the prior art, software product features were implemented directly by some software components that were packaged together. Purchase and installation of the software components would allow user access to the feature. But the inventors recognized that a problem with this approach was created when identifying opportunities for re-use of several major components. The inventors recognized that it was inefficient and expensive to re-release components in different combinations, depending on what the user purchased. On the other hand they recognized that it was unbeneficial to the supplier to give away any product features that were not purchased. Prior art approaches for re-use would have required at least one of the two problems just described.

The invention provides advantages over former approaches with a new architecture and method. It yields flexibility for re-use of software components without giving up control of user access and without requiring extensive combinatorial qualification and release procedures. It also allows for efficiently releasing one collection of software components referred to as a bundle for each hardware platform and still controlling the particular product features available to the user. This bundling greatly simplifies the distribution of patches and software updates because there is only one update for each platform. It does not depend on which products are enabled.

Regarding terminology, Package throughout this document refers to a collection of software at a certain release level. It also includes Enablement control that controls user access to the feature and which could be independent of release. Examples of software Packages that may be used with the methods and architecture embodiments described herein in a preferred embodiment include EMC's SNAPVIEW™, SAN COPY™, and MIRRORVIEW/A™, all available from EMC Corporation and particularly useful with the preferred storage array, EMC CLARIION™, all from EMC of Hopkinton, Mass.

Examples of Environment in which the Invention is Useful

It is helpful to understand the invention by understanding an example of a prior art configuration in which environment the invention is useful for overcoming problems. FIG. 1 shows a software package (Package) 10 including Executable code, which is a component. It also includes Enablement control that controls user access to features of the component.

Figure 2:
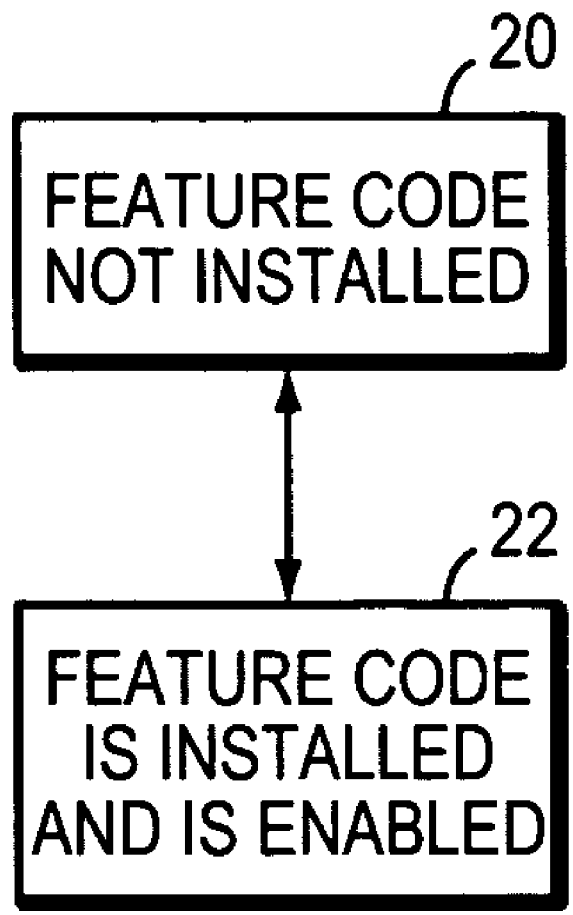
FIG. 2 is another schematic diagram of a prior art method for controlling access and use of software and is related to the method of FIG. 1.

FIG. 2 shows enablement states in a prior art configuration. Such states include State 20 Feature State is not installed, or State 22 Feature State is installed and enabled. In State 20, the code for each feature is disabled for any use only because it was never installed. With such a prior art package enablement was a product of installation such that it was automatically enabled on install (and not enabled if not installed). The installation and enablement were inextricably intertwined thus lacking in flexibility and inefficient for change management. In State 22, the feature code also consumes system resources.

Figure 3:
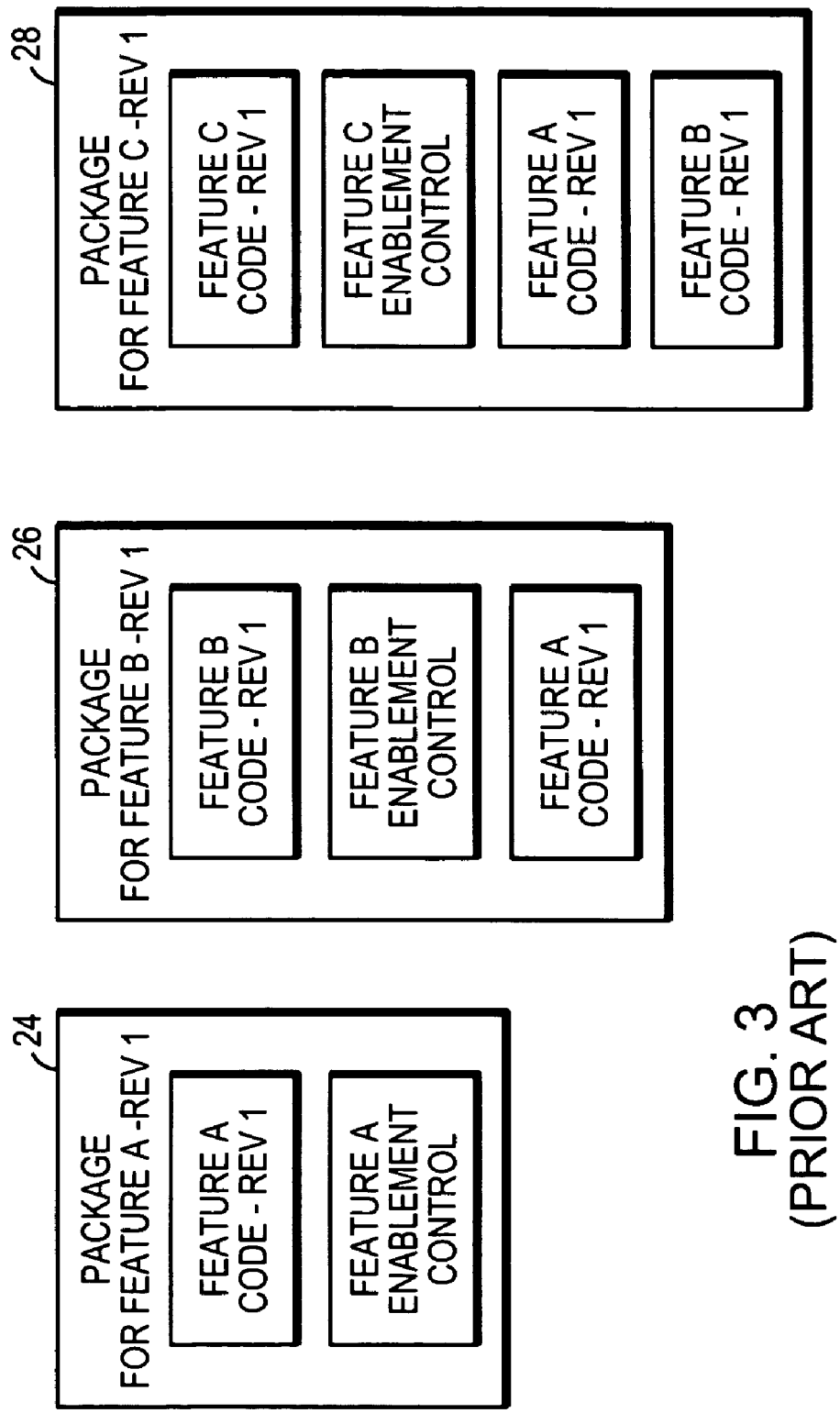
FIG. 3 is another schematic diagram of a prior art method for controlling access and use of software and is related to the method of FIGS. 1 and 2.

FIG. 3 shows an example of Packages with code re-use without the use of the invention. There is Package 24 for Feature A—Revision (Rev) 1, Package 26 for Feature B—Rev 1, and Package 28 for Feature C—Revision Rev 1. In order to support re-use of feature code and still allow independent installation of each feature, the prior art packaging for certain features must contain duplicated code. In this example, (1) Feature A only uses its own Engine code; (2) Feature B uses the Engine code for Features A and B; and (3) Feature C uses the Engine code for features A, B and C. The package for Feature A contains no duplicated code because it doesn't currently make use of any other features. Blocks depicted in Package 26 and 28 for Feature A and Feature B (Package 28 has both) are duplicated code that logically belongs in packages that support another feature, but is present here because the other packages may not be installed. The inventors have critically recognized that this is inefficient and costly. It may be costly for the provider of the software and also for the customer.

The inventors have recognized ways that such a inefficient configuration for enablement states would have been handled without the invention would have been problematic. Table 1 shows a prior art way of handling enablement states, but it is an example presented for better understanding the invention and is not actually known to be implemented in the prior art.

TABLE 1

| | Packages present | | | |
|---|---|---|---|---|
| Step | Feature A | Feature B | Feature C | Details of this step |
| 1 | No | No | No | Initial state - No feature packages are installed. |
| 2 | No | Yes | No | Install the Feature B Package - Feature B uses Feature A so it includes Feature A code as well, but must ensure the user doesn't get access to Feature A. |
| 3 | No | Yes | Yes | Install the Feature C Package - Feature C uses Feature A and Feature B, so it must ensure that the included revisions of Feature A and B don't conflict with the ones in the Feature B Package. Furthermore, it must ensure the user gets access only to Features B and C but not A. |
| 4 | No | No | Yes | Remove the Feature B Package - Now a check must be made to be sure it is running the feature A and B code from the Feature C package, and must stop user access to Features A and B without disrupting feature C. |
| 5 | Yes | No | Yes | Install the Feature A Package - Now a check must be made to ensure that the new revision of Feature A code is compatible with the already-running Feature A code contained in the Feature C package. Feature A now provides user access. |
| 6 | Yes | No | No | Uninstall Feature C Package - Now access is lost to Feature C, Feature B code must be stopped and Feature A must remain accessible and continue to provide access to Feature A. |

Figure 4:
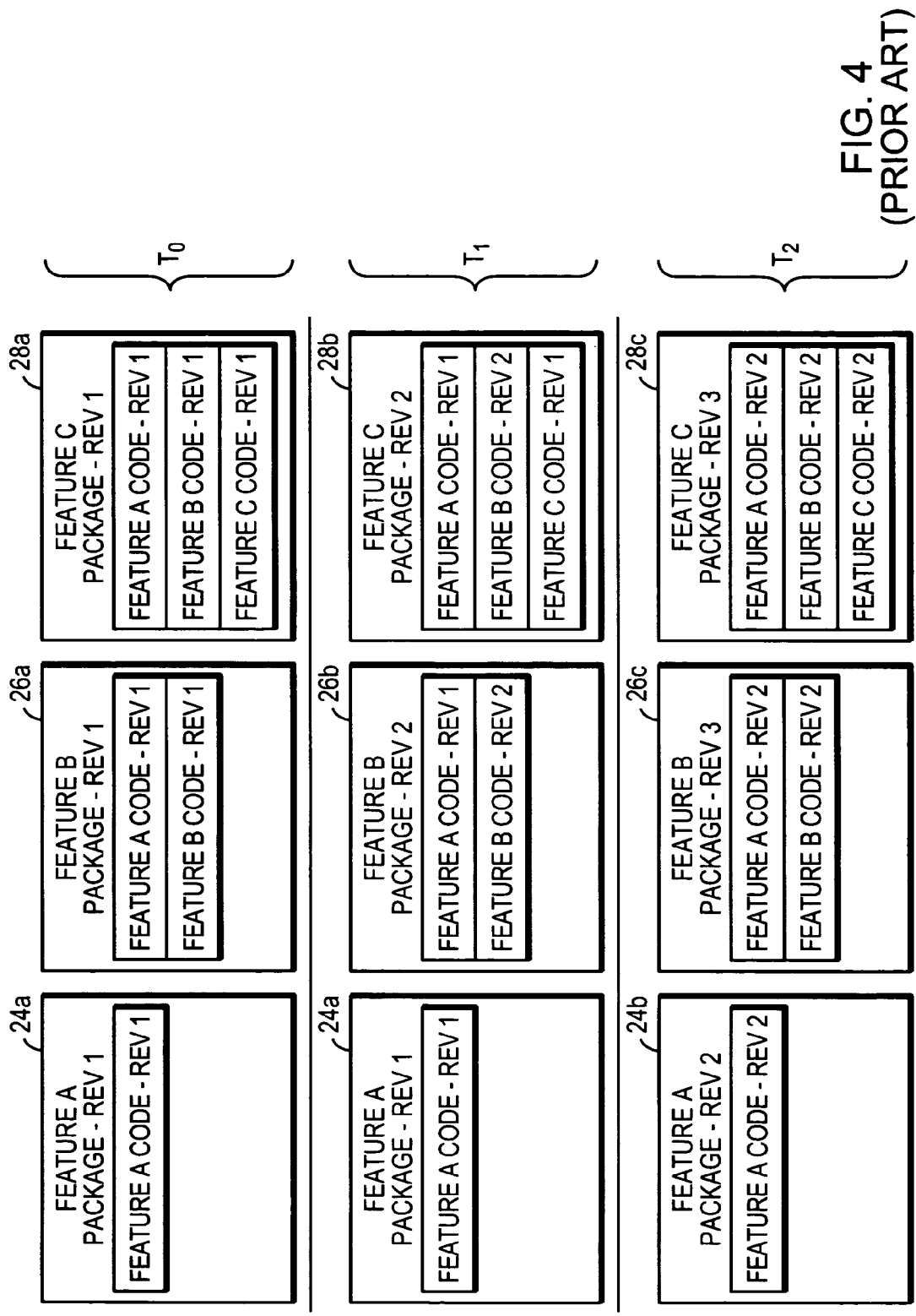
FIG. 4 is another schematic diagram of a prior art method for controlling access and use of software and is related to the method of FIGS. 1-3.

FIG. 4 shows a prior art configuration of handling Features across Package releases. Regarding Terminology, states of Packages are shown at times designated as $T_0$, $T_1$, and $T_2$ which represent any points in time in which certain revisions of packages including certain Features are present. The revision of a Package must reflect its contents. In this scenario, in general prior-art Packaging accommodates changes where code re-use is in effect: (1) new version of Code for Feature B; (2) new versions of Code for Features A & C. Generally, in the example a summary of Code-reuse is: (1) Feature A only uses its own Engine code; (2) Feature B uses the Engine code for Features A and B; and (3) Feature C uses the Engine code for features A, B and C. At $T_0$, Package 24a includes Feature A Package—Rev 1 and includes Feature A Code—Rev 1. Package 26a includes Feature B Package—Rev 1 and includes Feature A Code—Rev 1 and Feature B Code—Rev 1. Package 28a includes Feature C Package—Rev 1 and includes Feature A Code—Rev 1, Feature B Code—Rev 1, and Feature C Code—Rev 1. In this example, Release 1 is the initial release of all 3 packages. Note that B & C include engines for A, and C includes an engine for B.

Referring again to FIG. 4, At $T_1$, Package 24a includes Feature A Package—Rev 1 and includes Feature A Code—Rev 1. Package 26b includes Feature B Package—Rev 2 and includes Feature A Code—Rev 1 and Feature B Code—Rev 2. Package 28b includes Feature B Package—Rev 2 and includes Feature A Code—Rev 1, Feature B Code—Rev 2, and Feature C Code—Rev 1. In this example, Feature B code is modified to fix some problem. Note that Package C must be re-released even though no change to Feature C code is needed. This is shown to illustrate a drawback of prior art Packaging of Software.

Referring again to FIG. 4, at $T_2$, Package 24b includes Feature A Package—Rev 2 and includes Feature A Code—Rev 2. Package 26c includes Feature B Package—Rev 3 and includes Feature A Code—Rev 2 and Feature B Code—Rev 2. Package 28c includes Feature B Package—Rev 3 and includes Feature A Code—Rev 2, Feature B Code—Rev 2, and Feature C Code—Rev 2. In this example, code for Features A and C is changed to introduce some improvement, but the code for Feature B is unchanged. All 3 packages must be re-released to keep them in sync. Again, this is inefficient and illustrates a drawback of prior art configurations.

Figure 5:
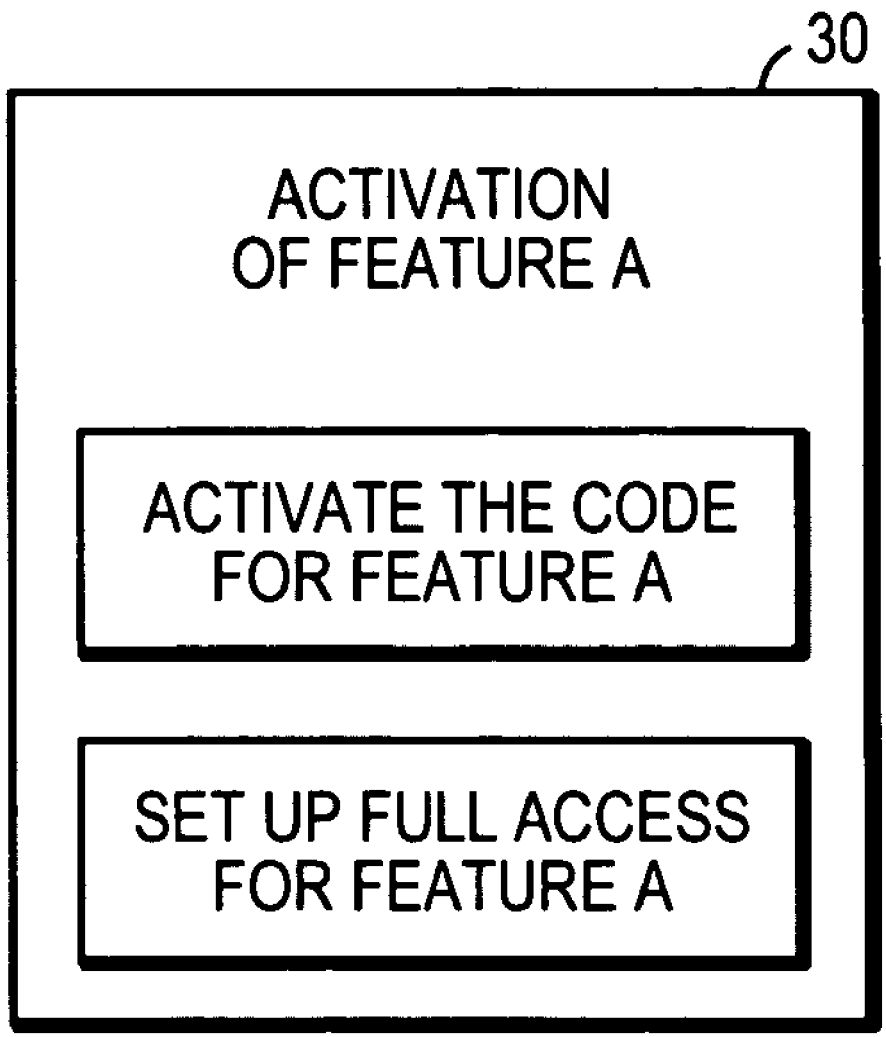
FIG. 5 is another schematic diagram of a prior art method for controlling access and use of software and is related to the method of FIGS. 1-4.

FIG. 5 shows prior art Activation Step 30 for Feature A. Such Activation includes a step to Activate the code for Feature A, and another step to set up full access for Feature A. There isn't much flexibility and combined with the inefficiency discussed above, the inventors have critically recognized that there are problems with prior art methods and architecture for which the invention had advantages.

Figure 6:
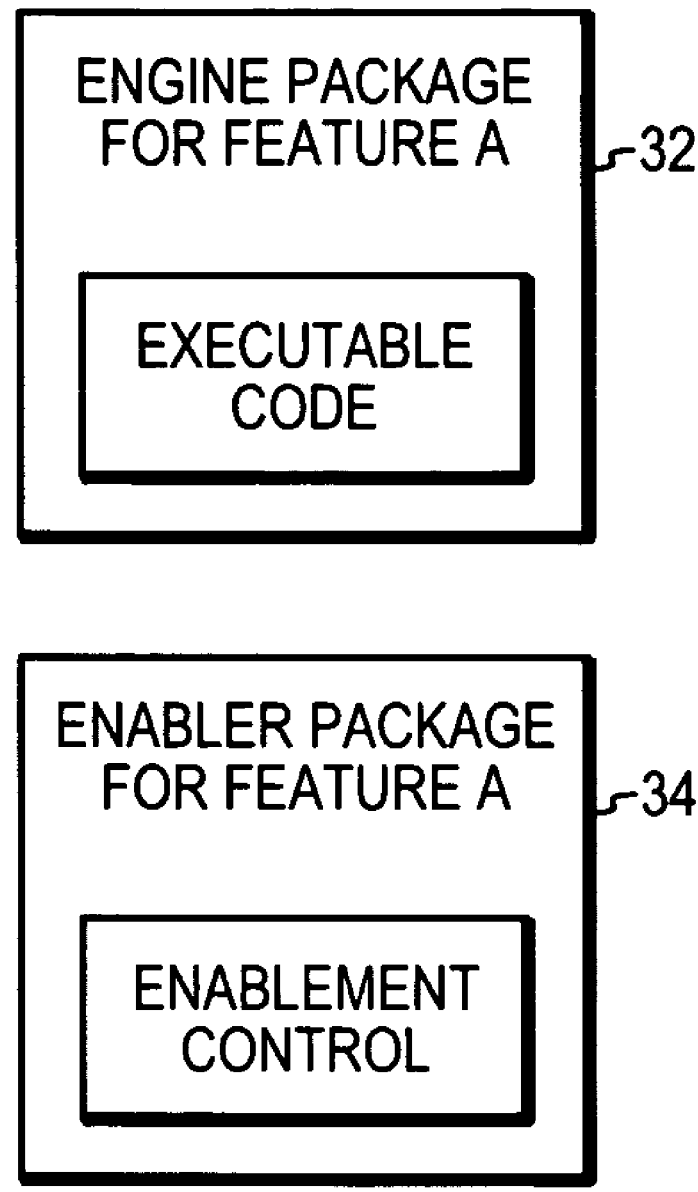
FIG. 6 is a schematic diagram of a new method for controlling access and use of software.

FIG. 6 shows a new method and architecture for a software package including an Engine Package 32, shown here for Feature A including Executable Code, but applicable to any feature when so configured. The new method and architecture also includes an Enabler Package 34, also shown here for Feature A including Enablement Control, but applicable likewise to any Feature (e.g. Feature B) when so configured. In this new method and architecture, Packaging related to Feature A is split into Engine and Enabler portions. The new enablement control is also broadened to differentiate between user and array enablement. As with the prior art, executable code provides the feature and is typically release-specific. In the new method and architecture, the Enablement control controls user access to the feature, controls access to the feature by other array software, and is typically independent of release. Array refers to a data storage array, e.g. the known EMC CLARIION™ data storage array, available from EMC of Hopkinton, Mass.

Figure 7:
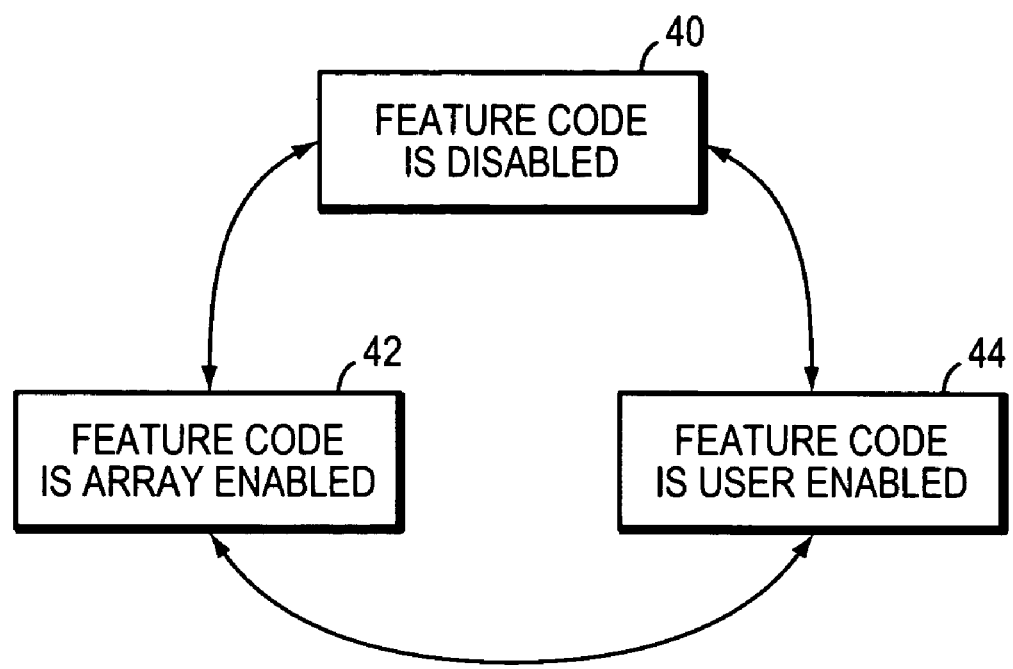
FIG. 7 is another schematic diagram of a new method for controlling access and use of software and is related to the method of FIG. 6.

FIG. 7 shows Enablement States with the new embodiment shown in FIG. 6. In step 40, a Feature code is disabled. When disabled, the code for each feature is unavailable to the user and to any other array software. It consumes minimal system resources. In step 42, a Feature code is array enabled, while in step 44, a Feature code is user enabled. When array enabled, the code for each feature may be used to perform the work of any another array feature, but may not be accessed by the user. It consumes system resources when enabled but provides advantages and flexibility. When user enabled, the code for each feature may be directly used by the user and also may be used to perform the work of any other array feature. It also consumes system resources when enabled and likewise provides advantages and flexibility. The inventors have critically recognized that progressing between such enablement states provides flexibility and economy to both software providers and users.

Table 2 shows how the enablement states may be handled with the new method and architecture embodiments of this invention.

TABLE 2

| | Enablement state of each feature | | | Enablers | |
|---|---|---|---|---|---|
| Step | Feature A | Feature B | Feature C | Present | Details of this step |
| 1 | Disabled | Disabled | Disabled | None | Initial state - No enablers are installed and all Engine packages are installed. |
| 2 | Array Enabled | User Enabled | Disabled | Feature B only | Install the Enabler for Feature B - note that since Feature B uses Feature A, it must array enable Feature A also, but the user will not have access to Feature A. |
| 3 | Array Enabled | User Enabled | User Enabled | Feature B & Feature C | Install the Enabler for Feature C - note that Feature C goes to enabled, but the other drivers are unchanged. |
| 4 | Array Enabled | Array Enabled | User Enabled | Feature C only | Remove the Enabler for Feature B - note that Feature B goes from User Enabled to Array Enabled instead of Disabled because Feature C still depends on it. |
| 5 | User Enabled | Array Enabled | User Enabled | Feature A & Feature C | Install the Enabler for Feature A - Feature A now provides user access. |
| 6 | User Enabled | Disabled | Disabled | Feature A only | Uninstall the Enabler for Feature C - note this involves losing array access to Feature B and all access to feature C. |

Figure 8:
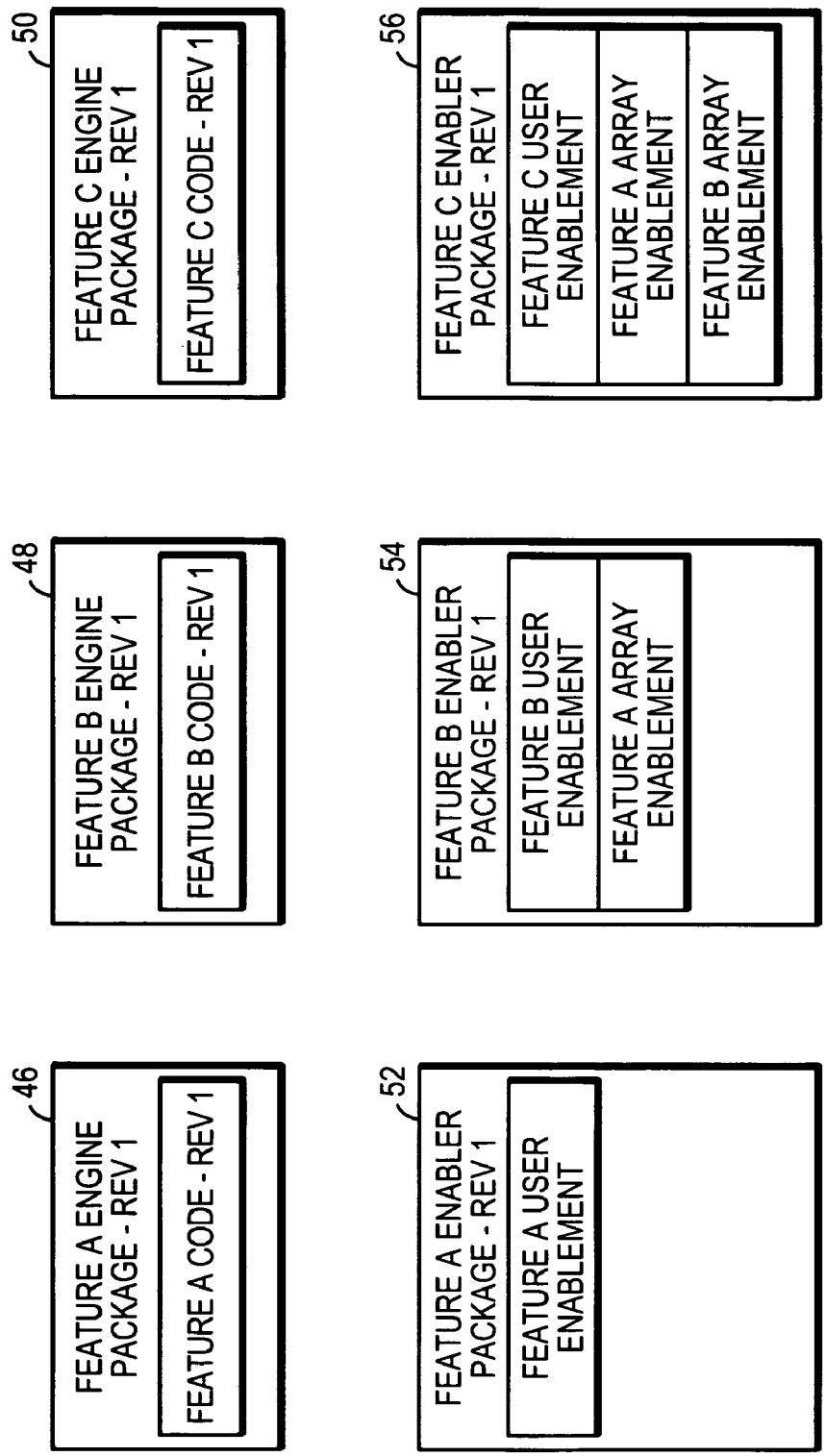
FIG. 8 is a schematic diagram of a new method for controlling access and use of software and is related to the method of FIGS. 6-7.

FIG. 8 shows the advantages of Factored Packages over the prior art for code re-use as shown in FIG. 3 (Prior Art) and is enabled by the new method and architecture embodiments of this invention. There is Package 46 for Feature A—Revision (Rev) 1, Package 48 for Feature B—Rev 1, and Package 50 for Feature C—Revision Rev 1, each including respective Feature Codes at the Rev 1 level. In order to support re-use of feature code and still allow independent installation of each feature, the new method packaging separates code (Engines) from feature enablement (Enablers). With that separation arises the possibility for one feature to enable another feature for array use (Array Enablement), without having to duplicate any code. There is also User Enablement in which a user can enable code, by for example purchasing a license and receiving rights to do so. In this example, 1) Feature A only uses it's own Engine code; (2) Feature B uses the Engine code for Features A and B; and (3) Feature C uses the Engine code for features A, B and C.

Referring again to FIG. 8, Enabler Packages 52, 54, and 56 are shown. There is Enabler Package 52 for Feature A—Rev 1. It only includes Feature A User Enablement. Enabler Package 54 for Feature B—Rev 1 includes Feature B User Enablement and Feature A Array Enablement. Enabler Package 56 for Feature C—Rev 1 includes Feature C User Enablement, Feature A Array Enablement, and Feature B Array Enablement. Code is re-used without code duplication. Instead, the enabler for one feature may also array enable other features, in addition to user enabling its own feature code (User Enablement).

Under the new method, engine packages are un-usable until enabled. This allows a cost-reduction not otherwise possible. All relevant engines are grouped into a single unit called a bundle. The bundle is released to all customers, regardless of which enablers they have purchased. Customers purchase enablers separately, and only such enablers allow user access to the software. These bundles simplify software distribution, installation and qualification because there is only one combination of engines to test and distribute. These bundles allow for extensive re-use of code and sharing of other files. Since most code is contained in engines and since enablers are now separate, customers do not need to re-install their enablers for each new release. This means that the steps for upgrading an existing array can be simplified further to involve only installing a new bundle, regardless of which enablers are present.

Figure 9:
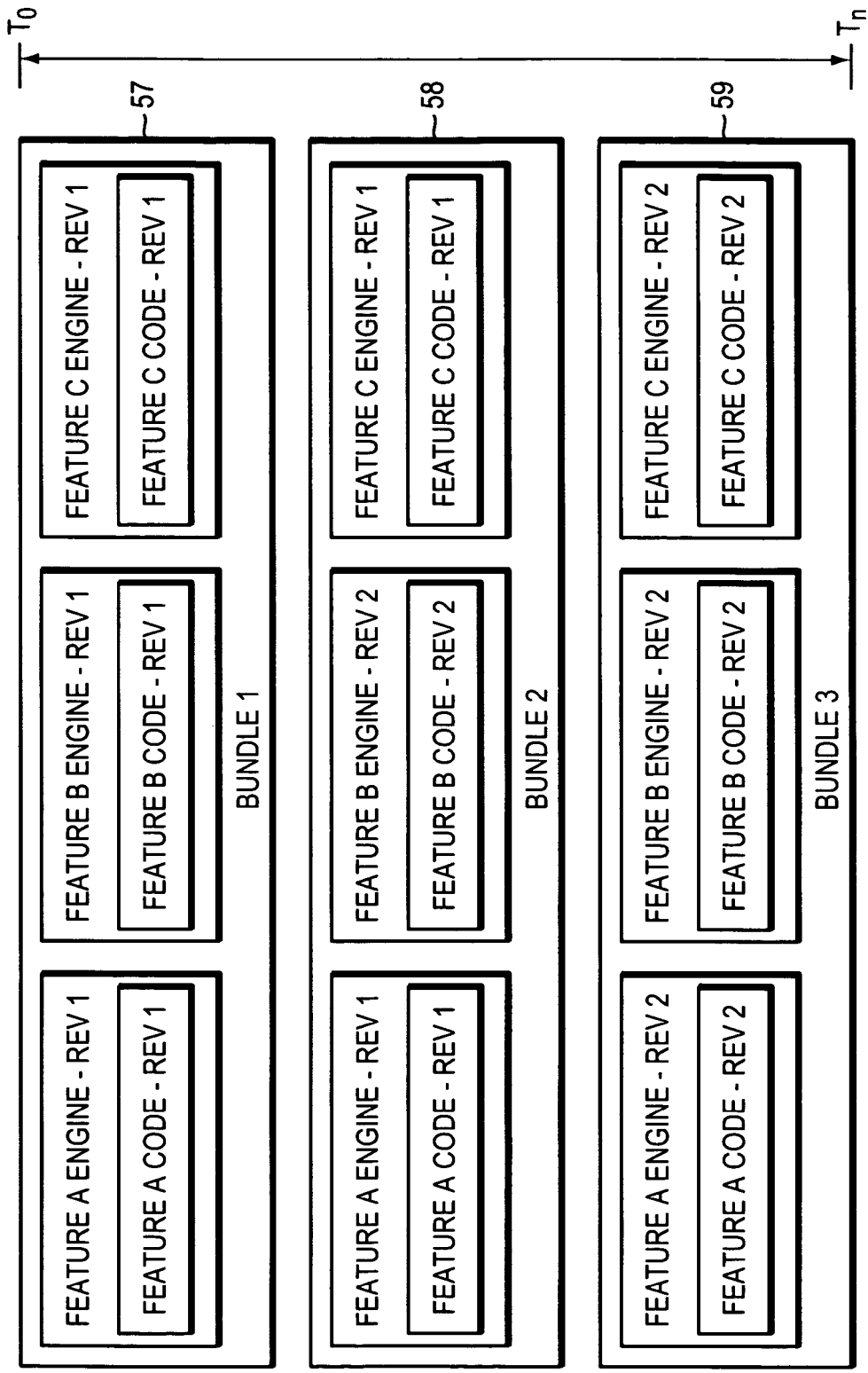
FIG. 9 is another schematic diagram of a new method for controlling access and use of software and is related to the method of FIGS. 6-8.

Referring to FIG. 9, an architecture of software bundles 1-3 is shown in bundles 57, 58, and 59 and allows a new way to handle releases of new software packages with embodiments of this invention and each bundle occurs respectively at a different time as time (T) progresses from a beginning time 0 ($T_0$) to an ending time n ($T_n$). In any case, the revision of a package must reflect its contents. In this scenario, new method packaging accommodates changes where code re-use is in effect. Since no code is duplicated, only changed engines need to be rebuilt. Enabler packages are installed only where the customer has purchased the corresponding feature. Engines can be bundled and installed on every array, regardless of which enablers are present. Bundle 57 includes Feature A Engine—Rev 1 which in turn includes Feature A Code—Rev 1. It also includes Feature B Engine—Rev 1 which in turn includes Feature B Code—Rev 1, and Feature C Engine—Rev 1 which in turn includes Feature C Code—Rev 1. This Bundle is an example of an initial release of all 3 packages.

Referring again to FIG. 9, Bundle 58 includes Feature A Engine—Rev 1 which in turn includes Feature A Code—Rev 1. It also includes Feature B Engine—Rev 2 which in turn includes Feature B Code—Rev 2, and Feature C Engine—Rev 1 which in turn includes Feature C Code—Rev 1. In this example, Feature B code is modified to fix some problem. No other packages need to change. This illustrates an efficiency of the invention.

Referring again to FIG. 9, Bundle 59 includes Feature A Engine—Rev 2 which in turn includes Feature A Code—Rev 2. It also includes Feature B Engine—Rev 2 which in turn includes Feature B Code—Rev 2, and Feature C Engine—Rev 2 which in turn includes Feature C Code—Rev 2. In this example, Feature A and C code is modified. No other packages need to change. This further illustrates an efficiency of the invention.

Figure 10:
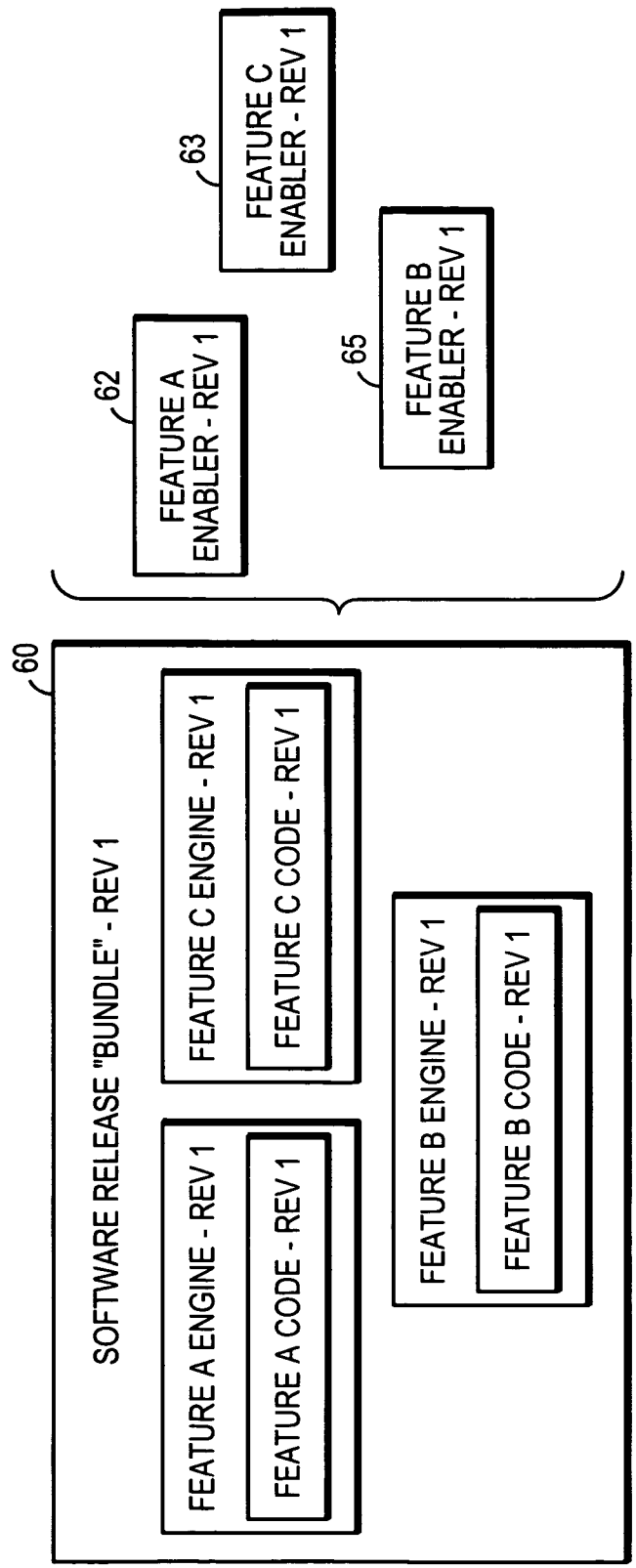
FIG. 10 is a schematic diagram of an architecture useful with the new method for controlling access and use of software and is related to the method of FIGS. 6-9.

FIG. 10 shows details of a software bundle 60 which is an architectural advantage of this invention. This example is at Rev 1, and includes Feature A Engine—Rev 1 which in turn includes Feature A Code—Rev 1. It also includes Feature B Engine—Rev 1 which in turn includes Feature B Code—Rev 1, and Feature C Engine—Rev 1 which in turn includes Feature C Code—Rev 1. This Bundle is similar to Bundle 57 shown in FIG. 9 but is shown here to illustrate that any of the engines may be enabled by its respective pairing enabler 62, 63, and 65. Enabler 62 is used to enable Feature A—Rev 1, and Enabler 63 and 65 enable Features C and B, respectively at Rev 1.

Figure 11:
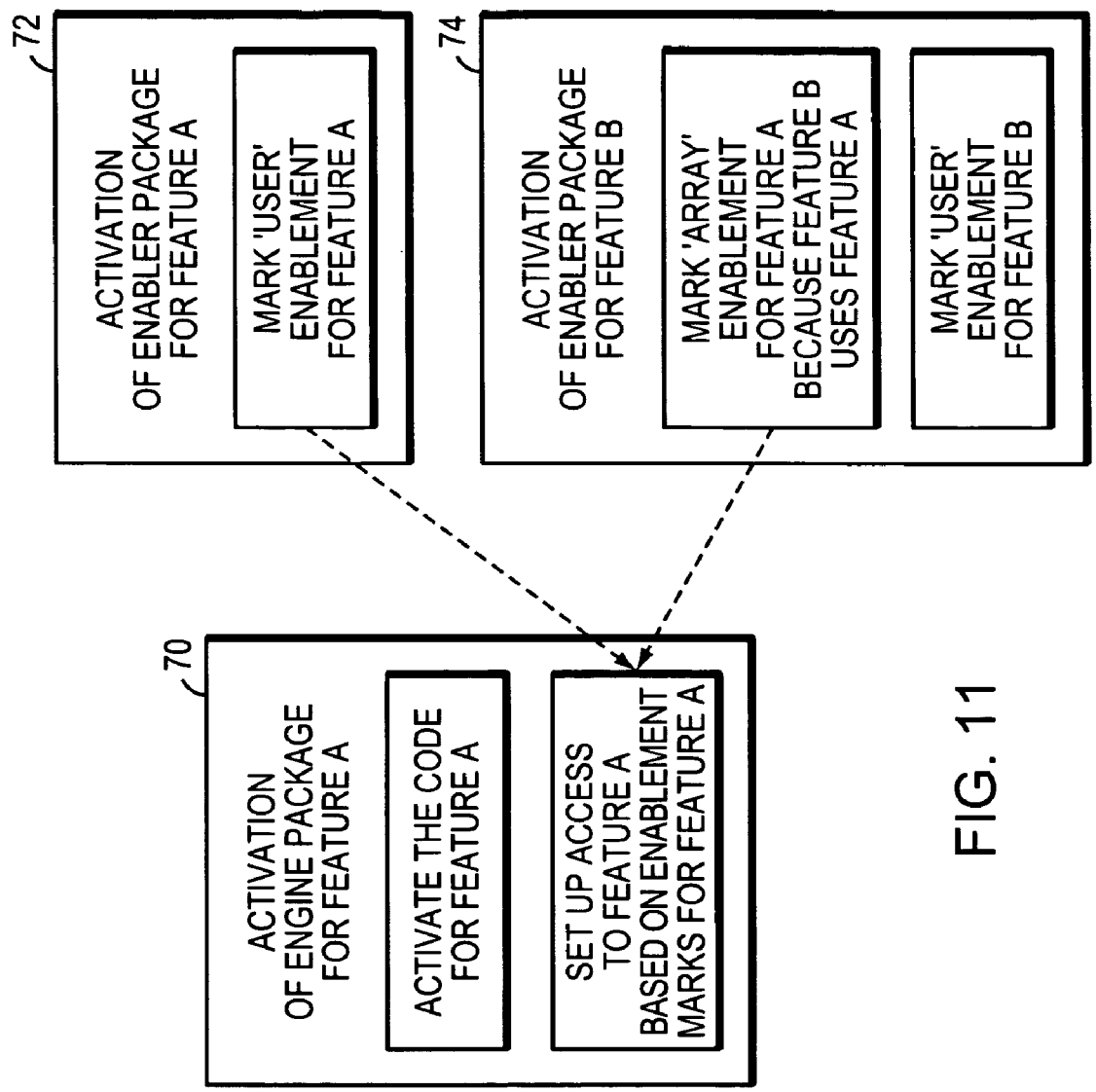
FIG. 11 is another schematic diagram of a new method for controlling access and use of software and is related to the architecture and method shown in FIGS. 6-10.

FIG. 11 shows activation and enablement using the method and architectural embodiments of this invention. In the new method, the work done in prior-art package activation is now split into work done by relevant engine and enabler packages. Feature A is activated when some enabler either user enables or array enables it. Step 70 groups the steps for activation of Engine Package for Feature A, which also may be done for any other Feature. It includes activating the code for Feature A. It also includes setting up access to Feature A based on enablement marks for Feature A. Steps related to the set up are Steps 72 and 74. In Step 72, which is part of the Activation of Enabler Package for Feature A, the User Enablement for Feature A is marked. In Step 74, which is also part of the Activation of Enabler Package, but for Feature B, the User Enablement for Feature B is marked. The Array Enablement is also marked for Feature A because Feature B uses Feature A.

Figure 12:
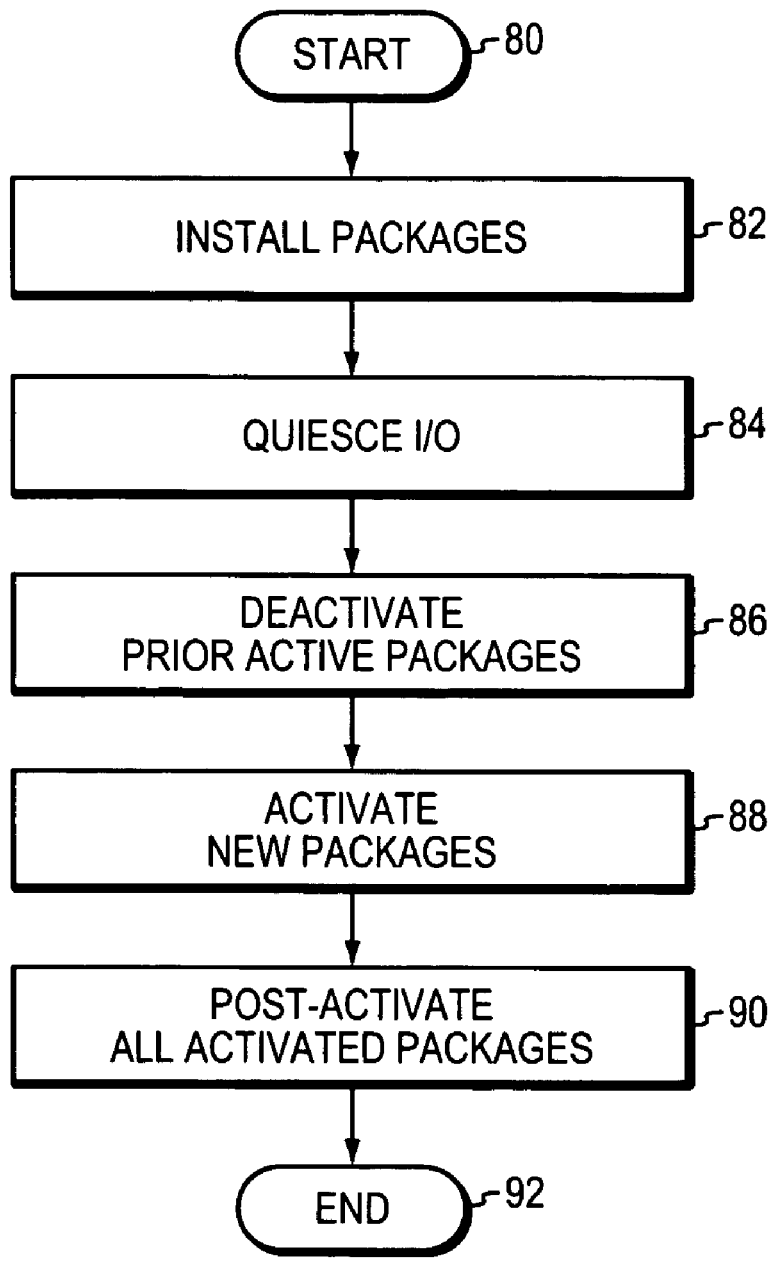
FIG. 12 is a flow logic diagram of a method of handling upgrades to software and is related to the method of controlling access and use of software and the architecture shown in FIGS. 6-11.

FIG. 12 is a flow-logic diagram illustrating a method of handling upgrades of Packages with this invention. It starts at Step 80. Packages are installed in Step 82. The I/O is quiesced to prepare for the upgrade in Step 84. Prior Active Packages are deactivated in Step 86. In Step 88, new Packages are activated. Activation involves different considerations for Engines and Enablers. When an Engine package for some feature is activated, the code is set up, but not enabled yet because it isn't known which enablers will be present. For Enabler packages, the activation sets the array and user enablement required for the feature. A Post-activation Step 90 is performed for all activated packages. In this step, each package that is currently active is re-examined to determine if any engine packages now need to be enabled. This step must occur after all activate steps, because new Enabler and Engine packages can be installed in any order.

Figure 13:
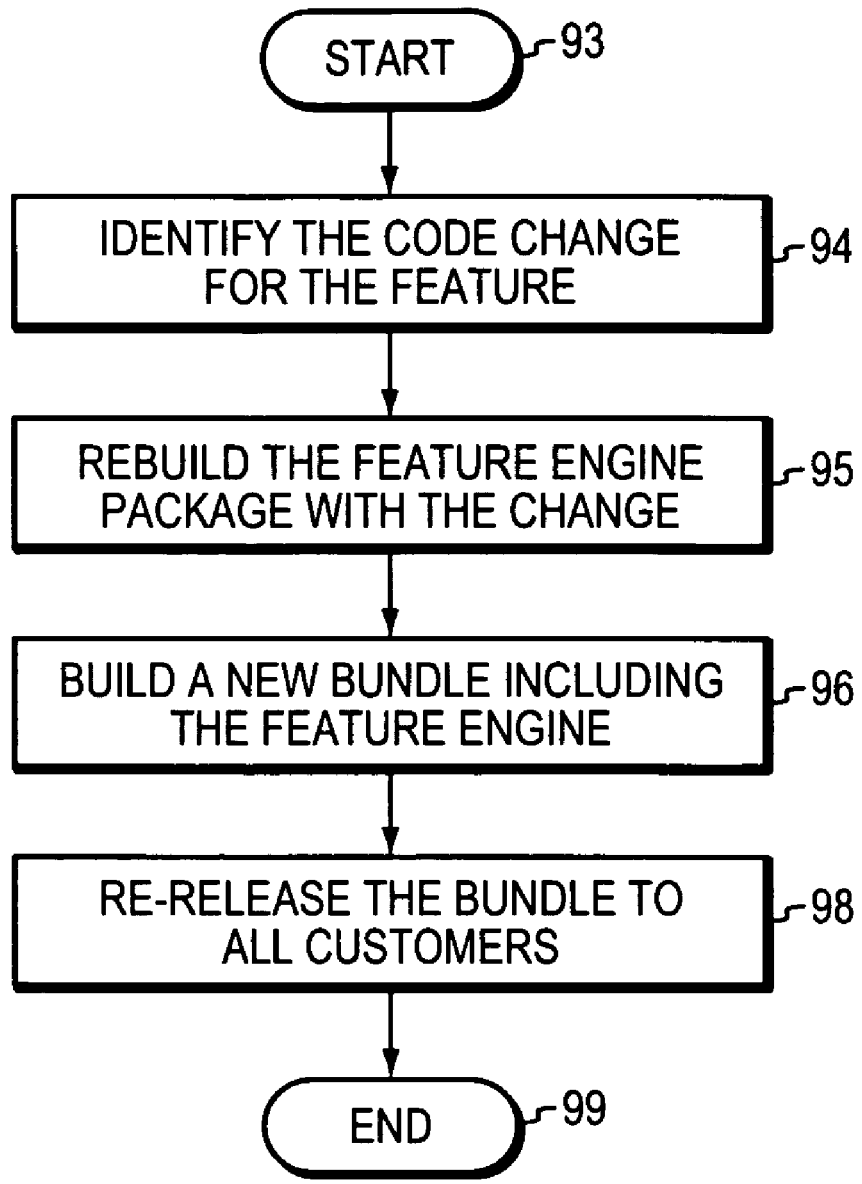
FIG. 13 is a flow logic diagram of a method of handling change to software and is related to the method of controlling access, use, and upgrades of software and the architecture shown in FIGS. 6-12.

FIG. 13 shows how a code change is handled using the method and architectural embodiments of this invention. It starts at Step 93. In Step 94, code changes for the Feature are identified. The Feature Engine Package is rebuilt with the change in Step 95. A new bundle is built which includes the Feature Engine in step 96. The bundle is re-released to all customers in Step 98, and processing ends in step 99.

Figure 14:
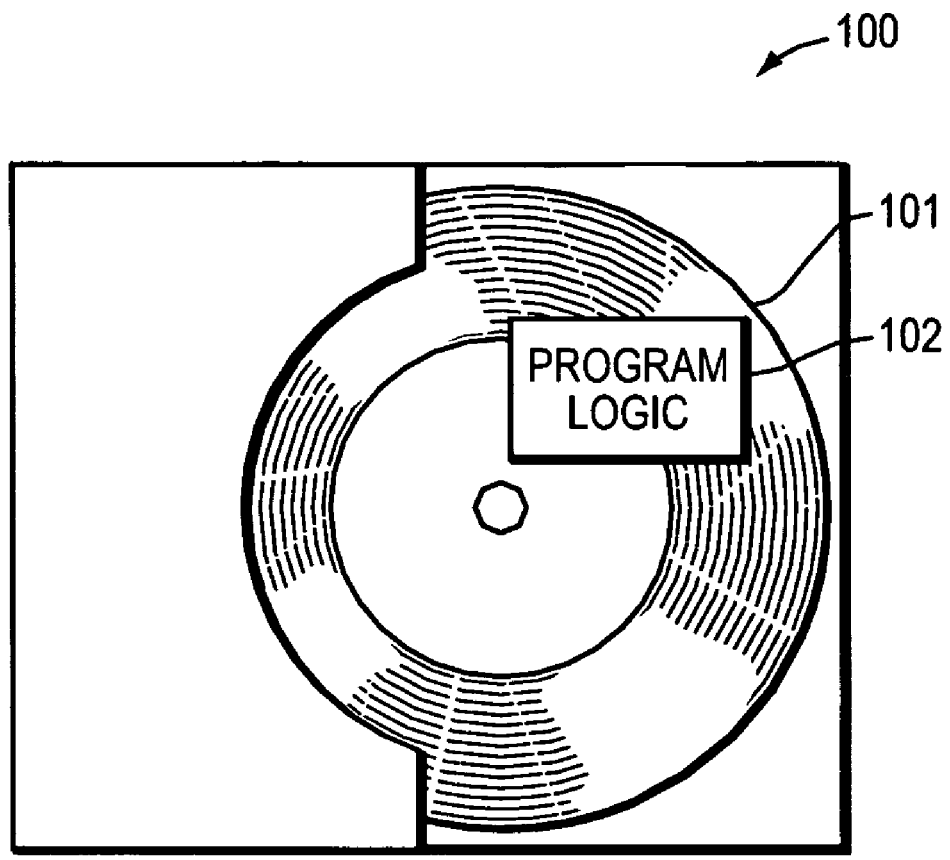
FIG. 14 is a computer program product including a computer-readable medium encoded with program logic capable of executing methodology described herein.

FIG. 14 shows a computer program product 100 including a computer-readable medium 101 encoded with computer program Logic 102 (software in a preferred embodiment). The Logic is configured for allowing a computer to execute the methodology described above. One skilled in the art will recognize that the Logic may also be loaded into conventional computer memory and executed by a conventional CPU. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the logic reconfigures a general purpose digital computer into a special purpose digital computer enabled for carrying out the process and methodology discussed herein. When implemented on a general-purpose processor, the program code combines with the processor of the computer to provide a unique apparatus that operates analogously to specific logic circuits.

A system and method has been described for controlling access to software in a data storage environment. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A computer-implemented method for controlling access to software features provided with software in a machine-readable storage medium for a data storage system, the method comprising the steps of:

if an engine package including executable code providing selected software component features needs to be enabled, selecting exactly one of the following three available states for the selected software component features in the machine-readable storage medium using an enabler package that is separated from the engine package and controls access to the selected software component features: (i) enabled access to the selected software component features for users and other software component features on the data storage system, (ii) enabled access to the selected software component features by other software component features on the data storage system, or (iii) disabled access to the selected software component features;

wherein the selected software component features use one or more software components of the software; and reusing the one or more software components from a version of a software package including the engine package and enabler package to another version of the software package while controlling access to the selected software component features by the selection of the one of the three available states for the selected software component features.

2. The method of claim 1, wherein the selected software component features in the state (i) are available to the users and to the other software component features on the data storage system.

3. The method of claim 1, wherein the selected software component features in the state (ii) are only accessible to the other software component features on the data storage system.

4. The method of claim 1, where the selected software component features in the state (iii) are not accessible to the users or to the other software component features on the data storage system.

5. The method of claim 1, wherein the selected software component features in the state (i) are available to the users and to the other software component features on the data storage system, and the selected software component features in the state (ii) are only accessible to the other software component features on the data storage system, and the selected software component features in the state (iii) are not accessible to the users or to the other software component features on the data storage system.

6. A computer program product for controlling access to software features provided with software for a data storage system, the product including a machine-readable storage medium encoded with program logic comprising computer-executable steps of:

if an engine package including executable code providing selected software component features needs to be enabled, selecting exactly one of the following three available states for the selected software component features in the machine-readable storage medium using an enabler package that is separated from the engine package and controls access to the selected software component features: (i) enabled access to the selected software component features for users and other software component features on the data storage system, (ii) enabled access to the selected software component features by other software component features on the data storage system, or (iii) disabled access to the selected software component features;

wherein the selected software component features use one or more software components of the software; and reusing the one or more software components from a version of a software package including the engine package and enabler package to another version of the software package while controlling access to the selected software component features by the selection of the one of the three available states for the selected software component features.

7. The computer program product of claim 6, wherein the selected software component features in the state (i) are available to the users and to the other software component features on the data storage system.

8. The computer program product of claim 6, wherein the selected software component features in the state (ii) are only accessible to the other software component features on the data storage system.

9. The computer program product of claim 6, where the selected software component features in the state (iii) are not accessible to the users or to the other software component features on the data storage system.

10. The computer program product of claim 6, wherein the selected software component features in the state (i) are available to the users and to the other software component features on the data storage system, and the selected software component features in the state (ii) are only accessible to the other software component features on the data storage system, and the selected software component features in the state (iii) are not accessible to the users or to the other software component features on the data storage system.

11. A system for controlling access to software features provided with software for a data storage system, the system comprising:

a data storage system having a processor with software components that have features, and computer program logic in communication with the data storage system having the processor for:

if an engine package including the software components providing selected software component features needs to be enabled, selecting exactly one of the following three available states for the selected software component features in a machine-readable storage medium using an enabler package that is separated from the engine package and controls access to the selected software component features: (i) enabled access to the selected software component features for users and other software component features on the data storage system, (ii) enabled access to the selected software component features by other software component features on the data storage system, or (iii) disabled access to the selected software component features;

wherein the selected software component features use the software components of the software; and reusing the software components from a version of a software package including the engine package and enabler package to another version of the software package while controlling access to the selected software component features by the selection of the one of the three available states for the selected software component features.

* * * * *